(No Model.)
C. ENGEL.
LEMON SQUEEZER.
No. 407,433. Patented July 23, 1889.
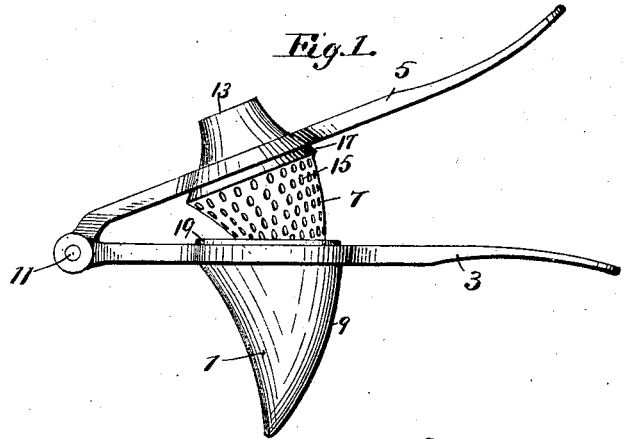
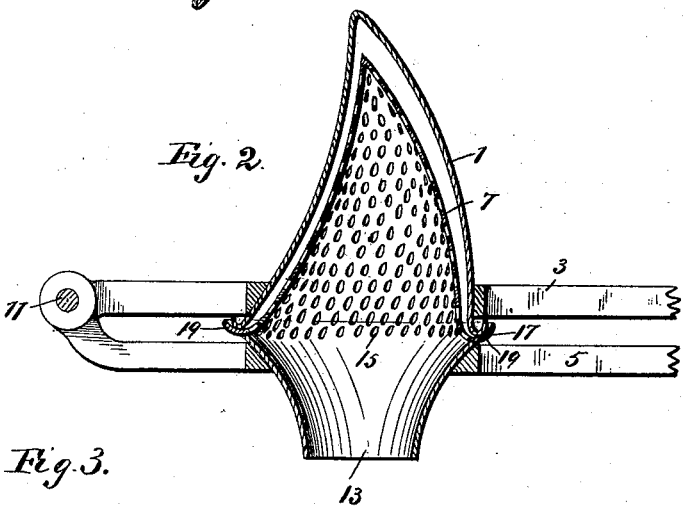
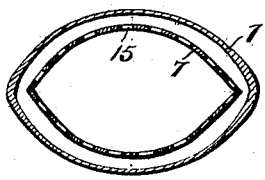
Witnesses.
J. Jessen
A. M. Gaskill
Inventor.
Clement Engel

UNITED STATES PATENT OFFICE.

CLEMENT ENGEL, OF ST. PAUL, MINNESOTA, ASSIGNOR OF ONE-HALF TO PHILIBERT BROYER, OF SAME PLACE.

LEMON-SQUEEZER.

SPECIFICATION forming part of Letters Patent No. 407,433, dated July 23, 1889.

Application filed March 15, 1889. Serial No. 303,416. (No model.)

*To all whom it may concern:*

Be it known that I, CLEMENT ENGEL, of St. Paul, in the county of Ramsey and State of Minnesota, have invented certain new and useful Improvements in Lemon-Squeezers, of which the following is a specification.

The object of my invention is to provide a squeezer having an imperforate cup or receiver, into which the whole fruit can be placed, and a hollow perforated plunger adapted to be forced into the receiver and to cut and squeeze the lemon, the juice passing through the perforations and out from its interior; and it consists generally in the construction and combination hereinafter described, and particularly pointed out in the claims.

In the drawings forming a part of this specification, Figure 1 is a side elevation of my improved squeezer. Fig. 2 is a longitudinal section of the same; and Fig. 3 is a detail.

In the drawings, 1 is the cup or receiver for the lemon, which is rigidly secured to one of the hinged handles 3 and 5, by means of which the device is operated. This receiver may be made of any suitable material, and is preferably curved or horn-shaped, the curve of its side 9 farthest from the hinge 11 being approximately that of a circle whose center is the hinge 11.

Secured to the opposite handle 5, so as to fit into the receiver when the handles are closed together, is the plunger 7, preferably curved similarly to the receiver, so that the point of the plunger enters and passes centrally into the receiver. The receiver is preferably slightly flattened, or of elliptical form in cross-section, as shown by Fig. 3. The plunger is of similar exterior form, but is preferably brought to a cutting-edge with sharp point, and is constructed of metal or other suitable material to hold a cutting-edge. The object of this construction is that the whole fruit may be placed in the receiver, and the closing of the squeezer will force the plunger into it, cutting its way through the rind and pulp. The plunger is hollow and is provided with the perforations 15 in its shell, and has the outlet 13 to allow the juice which runs through the perforations to flow out into a suitable receptacle. The plunger is also preferably provided with the lip 17, which fits over the edge 19 of the receiver when the squeezer is closed, and assists in forcing the juices through the perforations of the plunger to its interior.

The operation of the squeezer is as follows: The squeezer is opened, the plunger being thrown entirely out of the receiver. The lemon is then placed end down in the receiver, the handles of the squeezer being brought together, the plunger is forced into the fruit, cutting through its rind and crushing it against the walls of the receiver. The juices are thus forced through the perforations of the plunger and flow out of its interior through the orifice 13.

I claim as my invention—

1. A lemon-squeezer comprising, in combination, the handles 3 and 5, having the common hinge 11, the imperforate receiver 1, rigidly secured to one of said handles, and the hollow perforated plunger 7, secured to the other handle and adapted to fit into said receiver, said plunger being pointed and having cutting-edges and provided with the outlet 13, combined and operating substantially as described.

2. In a lemon-squeezer, the combination, with suitable handles 3 and 5, having a common hinge 11, of the imperforate receiver 1, rigidly secured to one of said handles, said receiver being curved or horn-shaped and of elliptical form in cross-section, the hollow plunger 7, rigidly secured to the other handle, curved symmetrically with said receiver and adapted to fit into said receiver, and provided with a point and cutting-edge, the perforations 15 through its walls, and the outlet 13 for the flow of juices from its interior, substantially as described.

In testimony whereof I have hereunto set my hand this 7th day of March, 1889.

CLEMENT ENGEL.

In presence of—
  T. D. MERWIN,
  J. JESSEN.